(12) United States Patent
Chang

(10) Patent No.: US 9,459,659 B2
(45) Date of Patent: Oct. 4, 2016

(54) MULTI-PORT MINI COMPUTER

(71) Applicant: Nai-Chien Chang, New Taipei (TW)

(72) Inventor: Nai-Chien Chang, New Taipei (TW)

(*) Notice: Subject to any disclaimer, the term of this patent is extended or adjusted under 35 U.S.C. 154(b) by 0 days.

(21) Appl. No.: 14/795,724

(22) Filed: Jul. 9, 2015

(65) Prior Publication Data

US 2016/0018850 A1 Jan. 21, 2016

(30) Foreign Application Priority Data

Jul. 18, 2014 (TW) .............................. 103212868 U

(51) Int. Cl.
*G06F 1/16* (2006.01)
*H01R 27/00* (2006.01)
*H01R 31/06* (2006.01)

(52) U.S. Cl.
CPC ............. *G06F 1/1633* (2013.01); *H01R 27/00* (2013.01); *H01R 31/065* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,661,635 A * | 8/1997 | Huffman | ............. | G06F 15/0283 345/901 |
| 6,257,902 B1 * | 7/2001 | Shieh | ..................... | H01R 27/02 361/679.32 |
| 7,075,784 B2 * | 7/2006 | Sullivan | ..................... | G06F 1/16 361/679.47 |
| 7,410,371 B2 * | 8/2008 | Shabtai | ..................... | G06F 1/16 439/131 |
| 7,834,276 B2 * | 11/2010 | Chou | ..................... | H05K 1/117 174/261 |
| 8,279,594 B2 * | 10/2012 | Chen | ................... | G06F 13/4022 361/679.4 |
| 8,953,311 B2 * | 2/2015 | Moser | ..................... | G06F 1/182 361/679.32 |
| 9,202,089 B2 * | 12/2015 | Yang | ..................... | G06K 7/0004 |
| 2007/0118683 A1 * | 5/2007 | Yang | ......................... | G06F 8/65 711/103 |
| 2012/0068538 A1 * | 3/2012 | Ye | ........................... | G06F 1/266 307/43 |
| 2013/0162907 A1 * | 6/2013 | Kim | ........................ | H04N 5/44 348/553 |
| 2013/0271905 A1 * | 10/2013 | Sullivan | ..................... | G06F 1/16 361/679.02 |
| 2013/0314869 A1 * | 11/2013 | Chang | ........................ | G06F 1/16 361/679.33 |
| 2014/0177161 A1 * | 6/2014 | Chang | ................... | G06F 1/1613 361/679.32 |

* cited by examiner

*Primary Examiner* — Lisa Lea Edmonds
(74) *Attorney, Agent, or Firm* — Chun-Ming Shih; HDLS IPR Services

(57) ABSTRACT

A multi-port mini computer includes a main housing and an adapting stage. The main housing comprises a first male connector, a microprocessor, a wireless network unit, an antenna, a second first male connector and a first casing enclosing above elements. The adapting stage comprises a second female, a third male connector, and a second casing enclosing above elements. The first casing has a sliding rail on outer face thereof and the second casing has a connection member on outer face thereof. The adapting stage is assembled to the main housing by connecting the connection member into the sliding rail. The first male connector, the second male connector and the third male connector are different kinds of male connectors, the second female connector is corresponding to the second male connector.

12 Claims, 9 Drawing Sheets

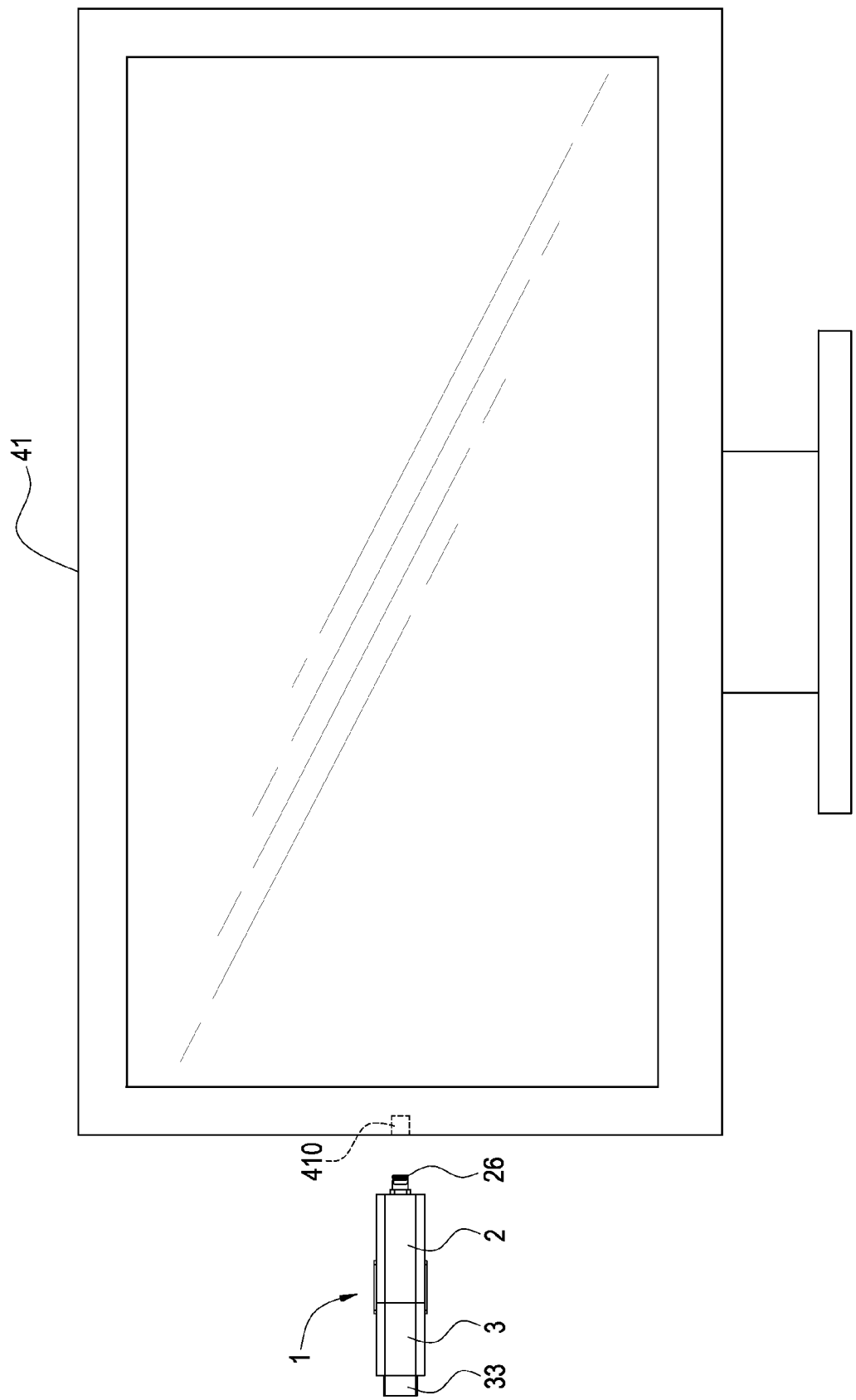

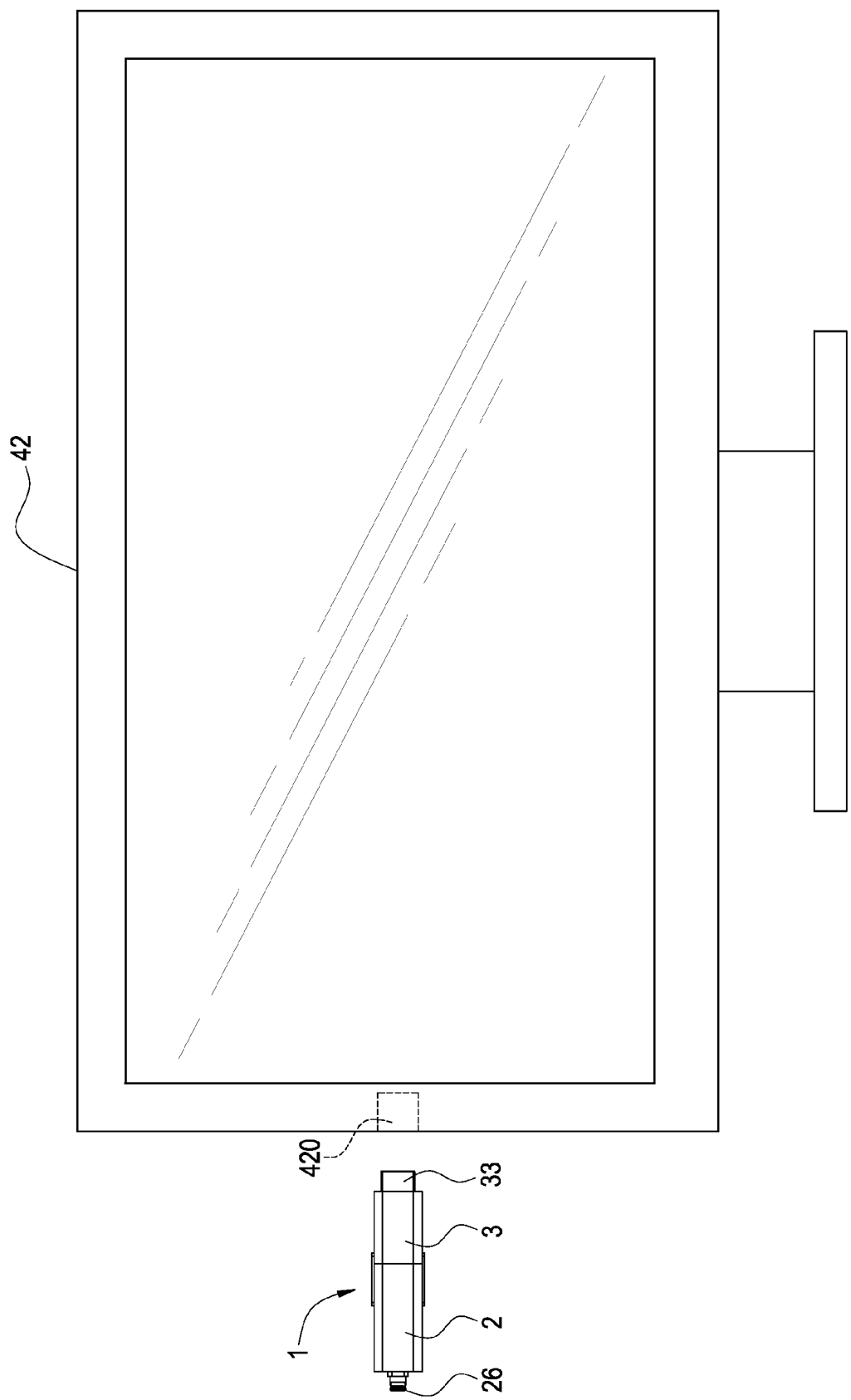

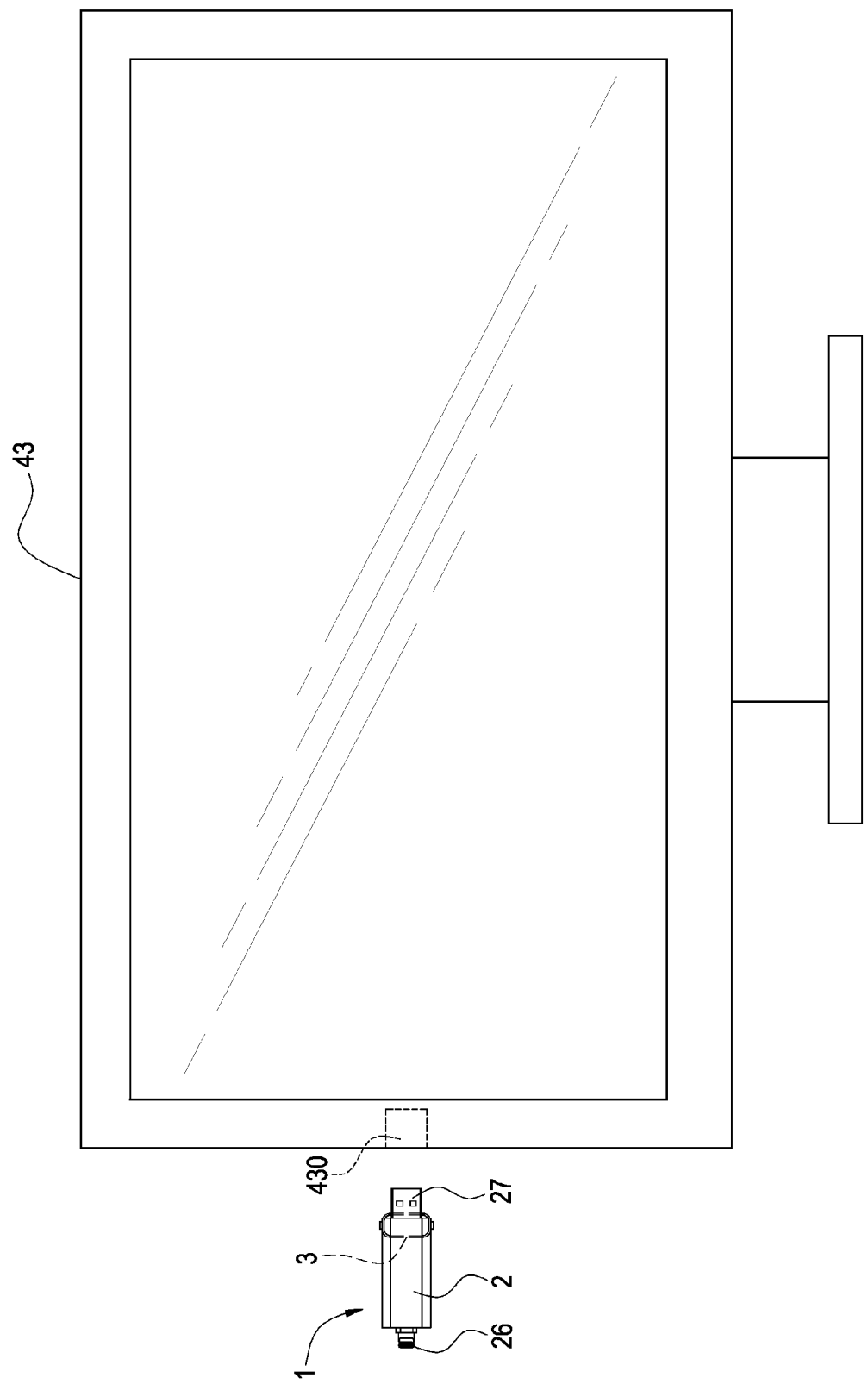

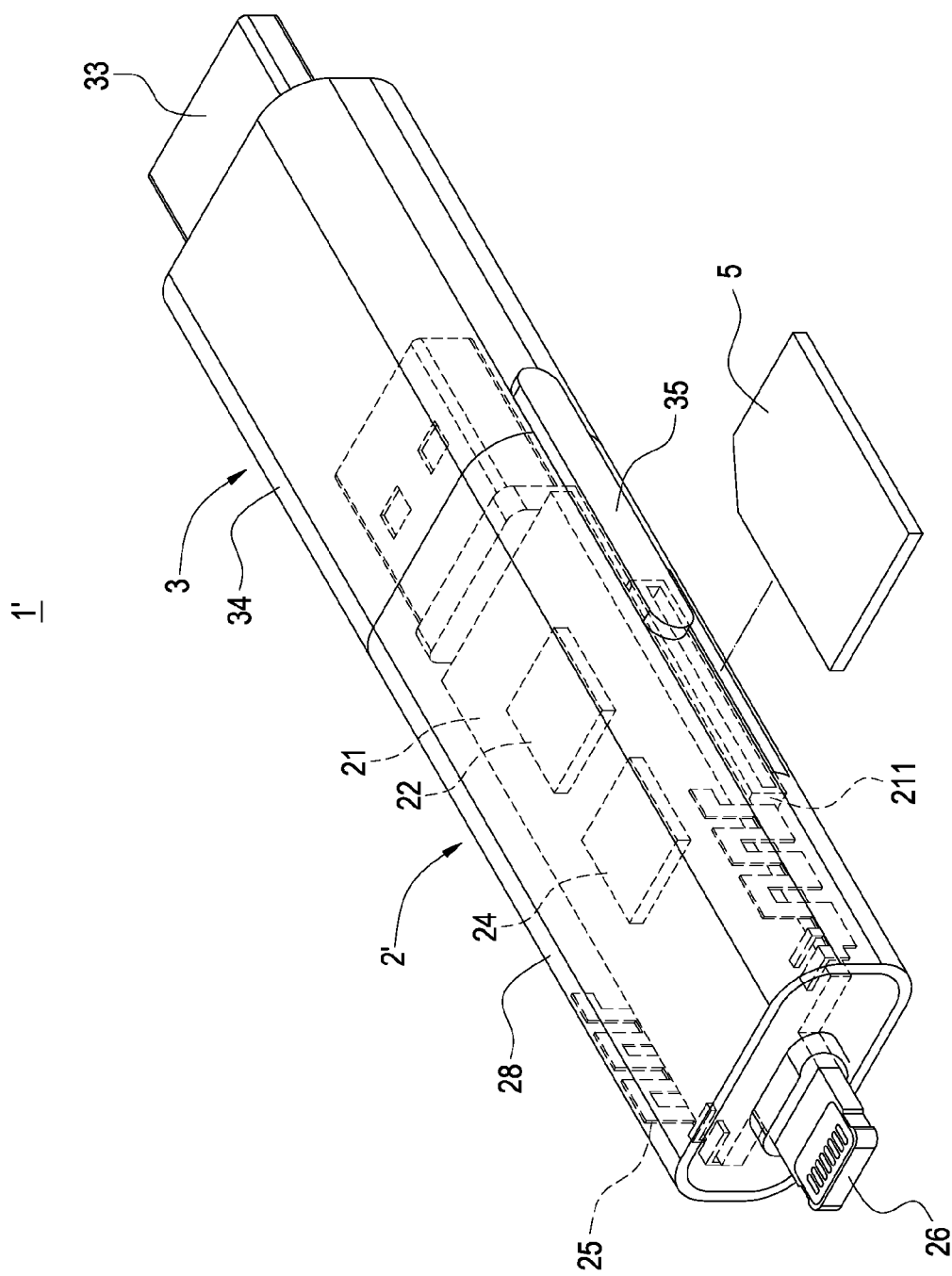

MULTI-PORT MINI COMPUTER

FIELD OF INVENTION

The present invention relates to mini computer, especially to a mini computer having multi-port.

BACKGROUND OF THE INVENTION

Computers become prevailing in every family. The traditional personal computers (PCs) need mainboard, Central Process Unit (CPU), Random Access Memory (RAM), display card, audio card, heat-dissipating fan and connectors as well as casing, rendering the PC having bulky size and weight and making it hard to carry.

As the continual breakthrough of semiconductor processing technology, the semiconductor electronic components have compact size with higher performance. Taking PC as example, the main components such as mainboard, CPU and RAM has more compact size and better heat dissipation efficiency. Even the video card and audio card can be directly built in the mainboard. Accordingly, mini computers are developed after laptop computers become popular.

The commercially available mini computers generally has an output interface, for example, High Definition Multimedia Interface (HDMI) male connector such that the male HDMI connector can be directly plugged into female HDMI connector of TV or display and the multimedia data (such as image or sound) can be played backed through the TV or display.

As above mentioned, the existing mini computers generally adopt HDMI connector for main interface of multimedia data. However, as the progress of technologies, diverse multimedia connectors for simultaneously transmitting data (such as video and audio data) and power are developed besides HDMI connector.

Moreover, TV or display manufactured of different brands may adopt different connectors for interfaces of external video and audio signals. User has problem to access TV or display manufactured of different brands by using the same mini computer.

To solve above problems, adapting connectors (such as USB to HDMI adapting connector) are developed for interface conversion. However, those adapting connectors have problem of tiny size, which is ease to lose.

SUMMARY OF INVENTION

It is an object of the present invention is to provide a multi-port mini computer capable of connecting to various electronic devices through different kinds of connectors, thus sending multimedia data to various electronic devices.

Accordingly, the present invention provides a multi-port mini computer comprising a main housing and an adapting stage. The main housing comprises a first male connector, a microprocessor, a wireless network unit, an antenna, a second first male connector and a first casing enclosing above elements. The adapting stage comprises a conversion circuit, a second female, a third male connector electrically connected to the conversion circuit, a second casing enclosing the second female connector, the third male connector and the conversion circuit. The first male connector, the second male connector and the third male connector are different kinds of male connectors, the second female connector is corresponding to the second male connector.

According to the present invention, one mini computer has a multiple connectors of different types and corresponding to interfaces of different kinds of electronic devices, whereby the compatibility of the mini computer can be enhanced and problem of failing to use electronic device can be prevented.

Moreover, the main housing of the mini computer according to the present invention has detachable adapting stage and the adapting stage is assembled to the main housing through the connection member, whereby the supportable connection types of the mini computer can be augmented and the risk of losing adapting stage can be reduced.

BRIEF DESCRIPTION OF DRAWINGS

FIG. 5A is a schematic view showing the application of the first embodiment of the present invention.

FIG. 5B is a schematic view showing the application of the second embodiment of the present invention.

FIG. 5C is a schematic view showing the application of the third embodiment of the present invention.

FIG. 6 is the perspective view of the second embodiment of the present invention.

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
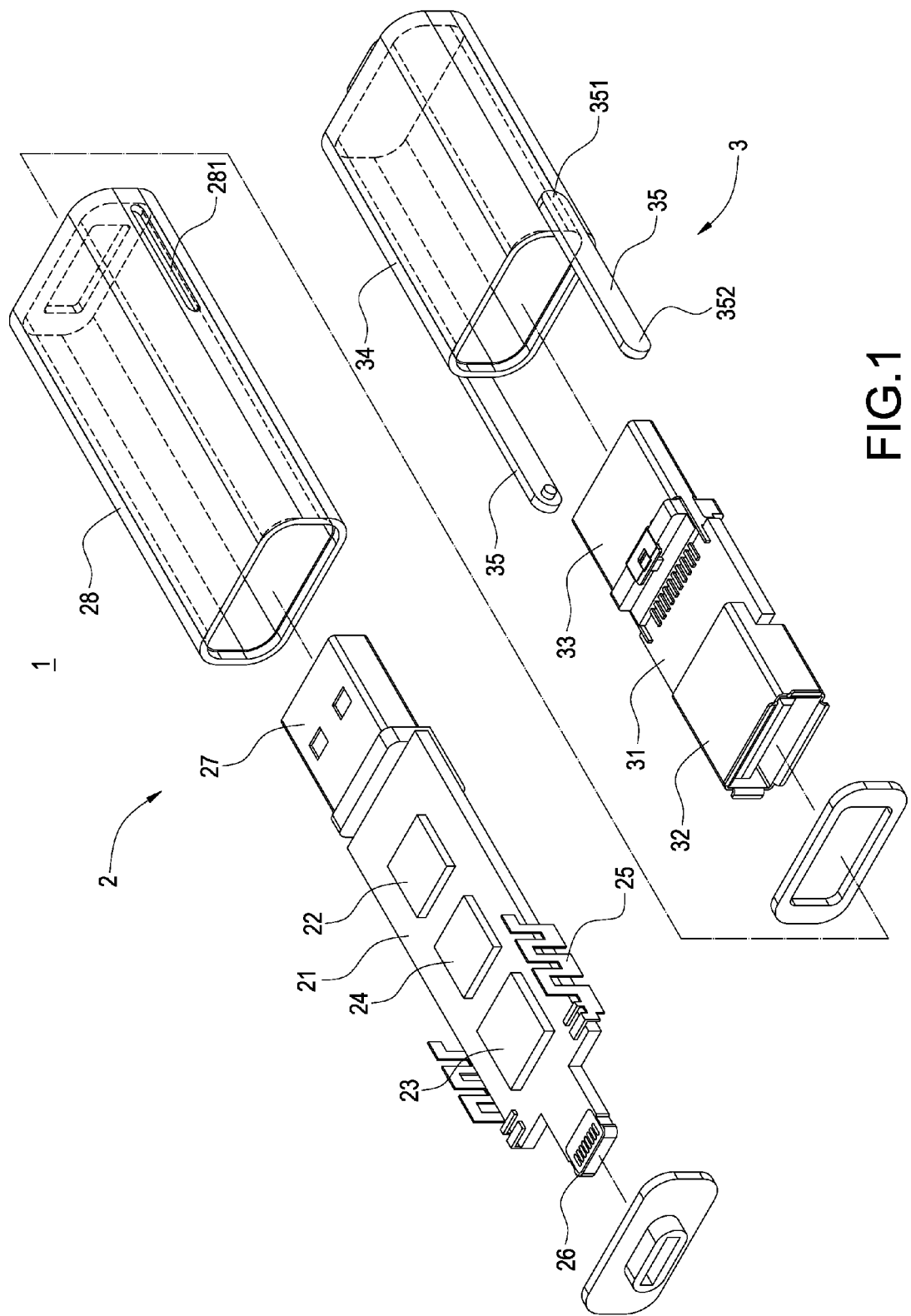
FIG. 1 shows the exploded view of the first embodiment of the present invention.
Figure 2:
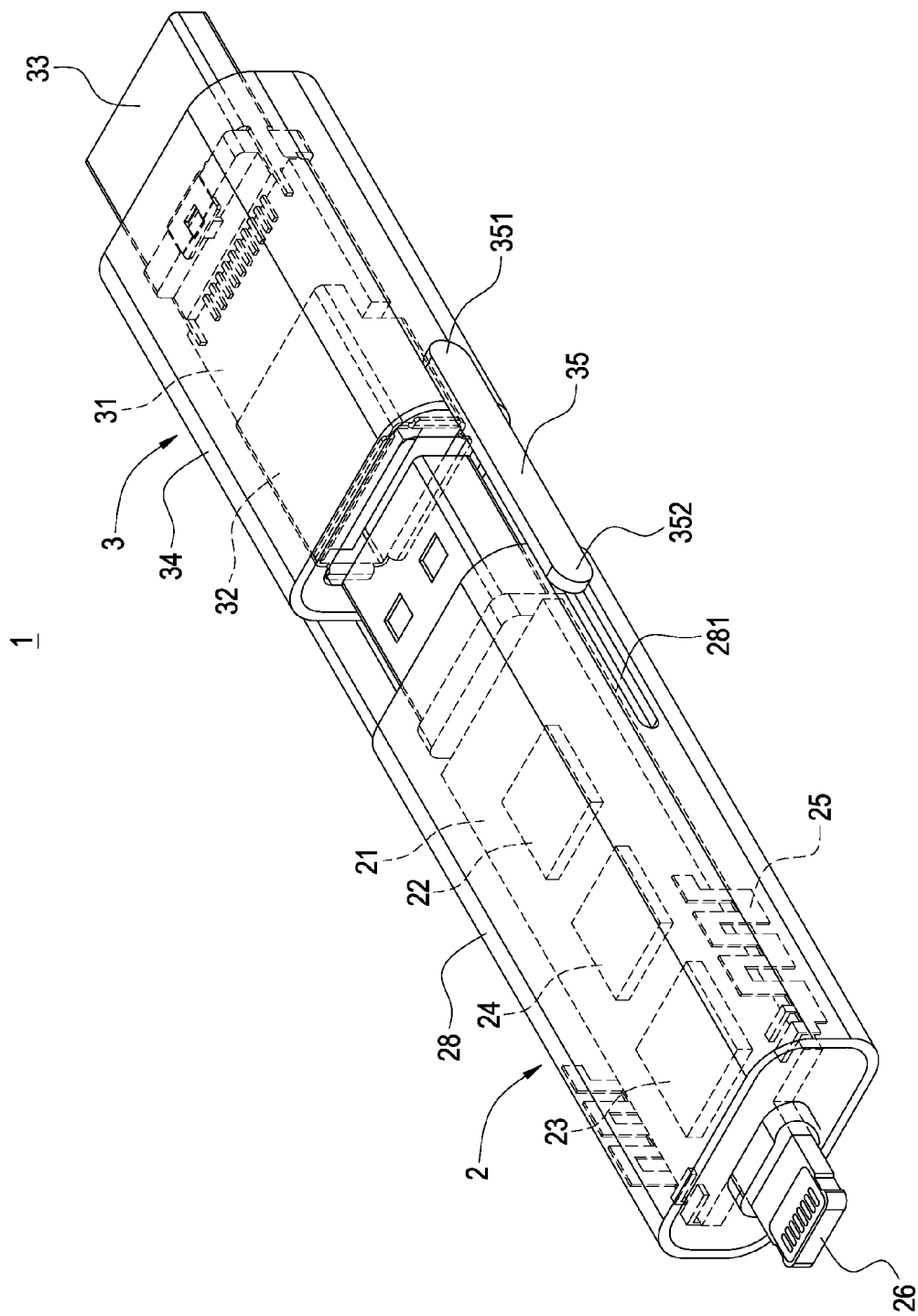
FIG. 2 shows the assembled view of the first embodiment of the present invention.
Figure 3:
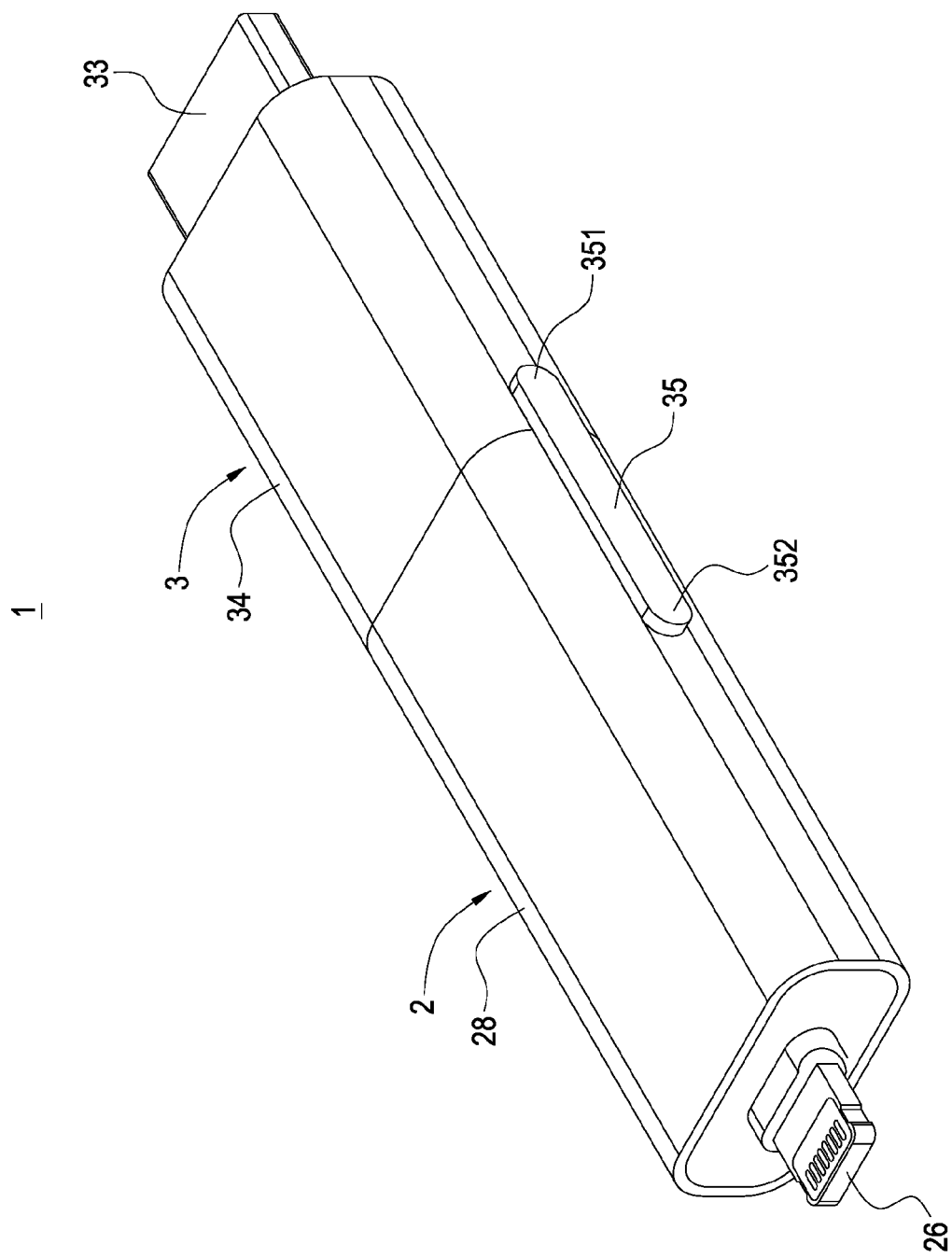
FIG. 3 shows the perspective view of the first embodiment of the present invention.

FIG. 1 shows the exploded view of the first embodiment of the present invention; FIG. 2 shows the assembled view of the first embodiment of the present invention; and FIG. 3 shows the perspective view of the first embodiment of the present invention. The present invention discloses a multi-port mini computer 1 (hereinafter referred to as mini computer 1 or mini cloud). The mini computer 1 comprises a main housing 2 and an adapting stage 3 detachably connected to the main housing 2.

As shown in FIG. 1, the main housing 2 mainly comprises a first circuit board 21, and further comprises a microprocessor 22, a wireless network unit 23, a memory 24, an antenna 25, a first male connector 26 and a second male connector 27, all of which are electrically connected to the first circuit board 21. In the embodiment shown in FIG. 1, the first male connector 26 extends from the first circuit board 21, namely, the first male connector 26 is a circuit board type connector and the terminals thereon are realized by golden fingers (not labeled). The second male connector 27 is an independently arranged connector and soldered to the second male connector 27. More particularly, the first male connector 26 is, for example but not limited to, Lightning male connector of Apple Inc. The second male connector 27 is, for example but not limited to, standard USB 2.0, USB 3.0, USB 3.1 or USB 3.0 C-type male connector.

In another embodiment, the first male connector 26 can be independently arranged male connector and the second male connector 27 can be extended from the first circuit board 21. In still another embodiment, both of the first male connector 26 and the second male connector 27 can be extended from the first circuit board 21, or both of the first male connector 26 and the second male connector 27 can be independently arranged male connectors.

The memory 24 of the mini computer 1 is used to store main Operating System (OS) such as Android OS of Google Inc., iOS of Apple Inc., or open OS such as Linux or Ubuntu. After booting, the microprocessor 22 executes one of above-mentioned OS and the multimedia data (such as video or audio data) processed by the microprocessor 22 is output through the first male connector 26 or the second male connector 27.

The mini computer 1 further receives, sends or processes wireless network signal (such as Wi-Fi) signals through the wireless network unit 23 and the antenna 25 can be used to enhance signal strength of wireless network signal, whereby the mini computer 1 can access Internet. In this embodiment, the antenna 25 is for example, but not limited to, a Planar Inverted-F Antenna (PIFA). Moreover, in another embodiment, the antenna 25 can also be an external antenna extended out of the mini computer 1.

The adapting stage 3 mainly comprises a second circuit board 31 and a second female connector 32 and a third male connector 33, both of which are electrically connected to the second circuit board 31. Similar to the description for the main housing 2, the third male connector 33 can be extended from the second circuit board 31, or is independently arranged male connector. In this embodiment, the third male connector 33 is for example, but not limited to, an HDMI male connector.

The second female connector 32 is an independently arranged female connector and soldered to the second circuit board 31. The configuration of the second female connector 32 is corresponding to the configuration of the second male connector 27 and can be engaged with the second male connector 27. Therefore, the adapting stage 3 can be retained to the main housing 2 by engaging the second female connector 32 with the second male connector 27. Therefore, the exposed connector of the combined structure will be the third male connector 33 rather than the second male connector 27. The third male connector 33 can be used to connect to an external electronic device and the multimedia data processed by the microprocessor 22 executing an OS can be sent to the external electronic device for playback.

In other word, the user can selectively use the first male connector 26 or the second male connector 27 of the main housing 2, depending on the type of female connector of the external electronic device to be connected. Alternatively, the user can selectively use the third male connector 33 by assembling the adapting stage 3 onto the main housing 2 such that the multimedia data processed by the microprocessor 22 executing an OS can be sent to the external electronic device for playback. In this embodiment, the first male connector 26, the second male connector 27 and the third male connector 33 are three different kinds of male connectors for respectively connecting to three different kinds of female connectors, where the three different kinds of female connectors can be provided for different kinds of electronic devices.

The main housing 2 further comprises a first casing 28 for enclosing the first circuit board 21, the microprocessor 22, the wireless network unit 23, the memory 24, the antenna 25, the first male connector 26 and the second male connector 27, where a part of the first male connector 26 and a part of the second male connector 27 expose out of the first casing 28. The adapting stage 3 further comprises a second casing 34 enclosing the second circuit board 31, the second female connector 32 and the third male connector 33, where a part of the second female connector 32 and a part of the third male connector 33 expose out of the second casing 34.

As shown in FIGS. 1-3, the first casing 28 has a sliding rail 281 on at least one outer face thereof, the second casing 34 has a connection member 35 on at least one outer face thereof. In this embodiment, the adapting stage 3 is assembled with the main housing 2 through the connection member 35 on the second casing 34.

More particularly, the connection member 35 is of elongated shape, and has a first pivot 351 at one end thereof and a second pivot 352 at another end thereof. The connection member 35 is connected to the face of the second casing 34 through the first pivot 351 and pivotally connected to the sliding rail 281 of the first casing 28 through the second pivot 352. The adapting stage 3 will not drop from the main housing 2 when the second female connector 32 is separated with the second male connector 27, due to the connection of the connection member 35 on the first casing 28 of the main housing 2. Moreover, the second pivot 352 is movable in the sliding rail 281 of the first casing 28. Therefore, the position of the adapting stage 3 can be adjusted by changing the relative position between the second pivot 352 and the sliding rail 281, and the usage of the second male connector 27 is not hindered by the adapting stage 3.

In this embodiment, the sliding rail 281 is arranged on the first casing 28 of the main housing 2. However, the sliding rail 281 can also be arranged on the second casing 34 of the adapting stage 3. Moreover, sliding rails can be provided on both outer faces of the first casing 28 and the second casing 34 such that the connection member 35 is connected to both sliding rails.

Figure 4:
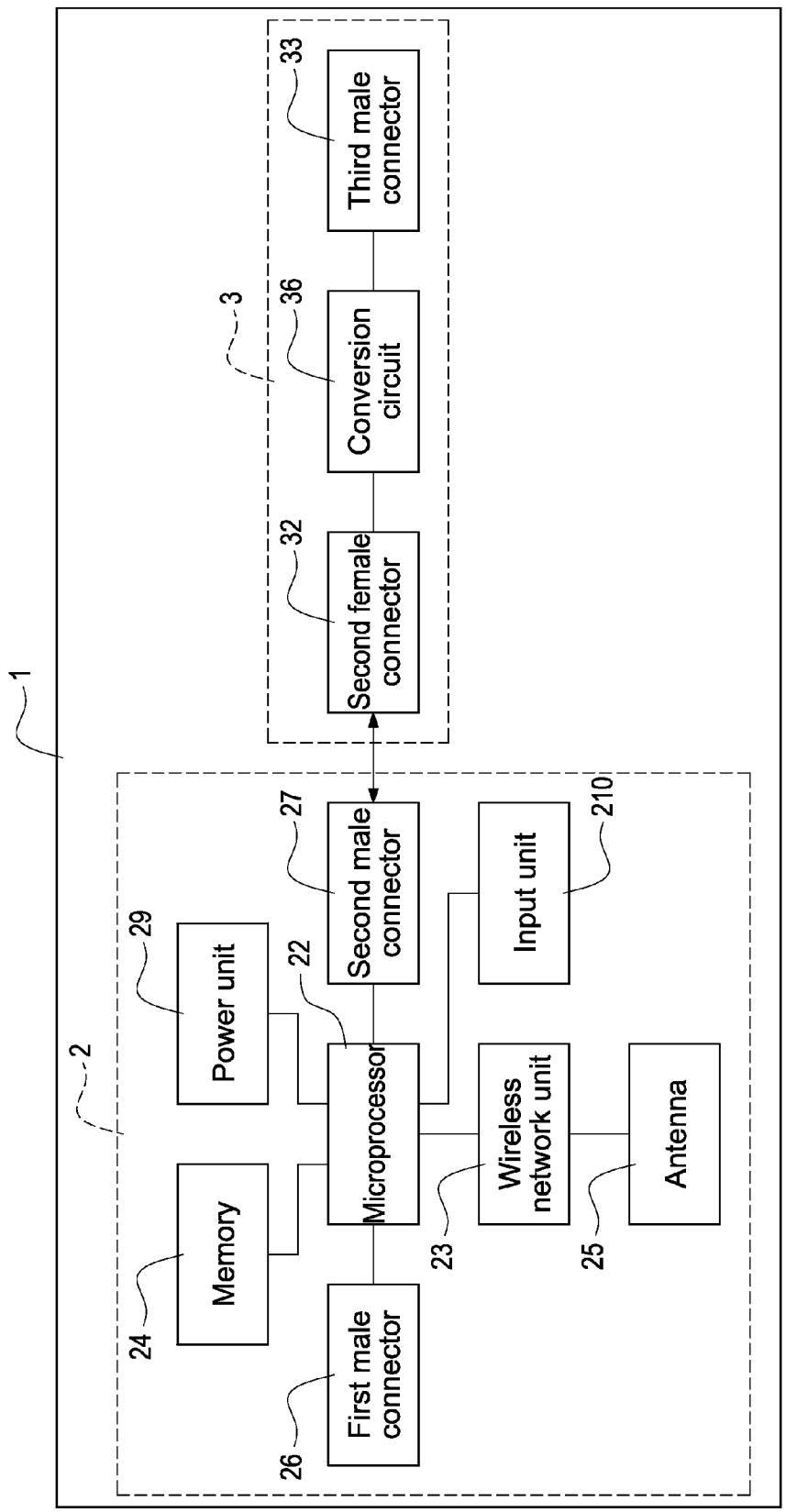
FIG. 4 shows the circuit block diagram of the first embodiment.

FIG. 4 shows the circuit block diagram of the first embodiment. The mini computer 1 mainly comprises a main housing 2 and an adapting stage 3. The main housing 2 mainly comprises a first circuit board 21, a microprocessor 22, a wireless network unit 23, a memory 24, an antenna 25, a first male connector 26 and a second male connector 27. The wireless network unit 23, the memory 24, the first male connector 26 and the second male connector 27 are electrically connected to the microprocessor 22 through the first circuit board 21 and the antenna 25 is electrically connected to the wireless network unit 23 through the first circuit board 21.

In this embodiment, the main housing 2 further comprises a power unit 29 electrically connected to the first circuit board 21 and then electrically connected to the microprocessor 22 through the first circuit board 21. According to one embodiment, the power unit 29 is battery to supply electric power required by the mini computer 1. According to another embodiment, the power unit 29 is a female connector such as standard USB female connector, micro USB female connector or USB C-type female connector. The female connector is electrically connected to one end of an electric wire and another end of the electric wire is electrically connected to an external power source whereby the mini computer 1 can get electric power of the external power source through the electric wire.

The main housing 2 can further comprise an input unit 210 electrically connected to the first circuit board 21 and further electrically connected to the microprocessor 22 through the first circuit board 21. In this embodiment, the mini computer 1 receives external command through wireless or wired medium by the input unit 210, thus controlling the operation system.

As mentioned above, the input unit 210 can be a wireless transmission unit such as a blue tooth transmission unit, an RF transmission unit, or a Zigbee transmission unit and wirelessly receive control command of a wireless control device (such as wireless keyboard or wireless mouse). In another embodiment, the input unit 210 can be a female connector such as a standard USB female connector or a micro USB female connector to connect an external wired control device such as a wired keyboard or a wired mouse. In still another embodiment, the input unit 210 can be a pressing key or a touch pad arranged on the mini computer 1 and exposed out of the first casing 28.

The adapting stage 3 mainly comprises a second female connector 32 and a third male connector 33. The second circuit board 31 comprises a conversion circuit 36, and the second female connector 32 and the third male connector 33 are operatively connected through the conversion circuit 36. User can freely select one of the first male connector 26 and the second male connector 27 on the main housing 2 to connect to an electronic device. Alternatively, user can use the third male connector 33 to connect to an electronic device and through the adapting stage 3. In this embodiment, the second male connector 27 and the second female connector 32 can be, for example but not limited to, standard USB 2.0, USB 3.0, USB 3.1 or USB 3.0 C-type connector. The third male connector 33 can be, for example but not limited to, HDMI connector. In other embodiments, the second male connector 27 and the second female connector 32 can be, for example but not limited to, HDMI connector, while the third male connector 33 can be, for example but not limited to, standard USB 2.0, USB 3.0, USB 3.1 or USB 3.0 C-type connector.

The above examples only show some embodiments of the present invention. The type of the first male connector 26, the second male connector 27 and the third male connector 33 of the mini computer 1 can be selected according to actual need. For example, the first male connector 26, the second male connector 27 and the third male connector 33 can be, for example but not limited to, standard USB 2.0, USB 3.0, USB 3.1 or USB 3.0 C-type connector, HDMI connector, mini HDMI connector, Lightning connector and e-SATA (external serial advanced technology attachment) connector.

FIG. 5A is a schematic view showing the application of the first embodiment of the present invention. The example in FIG. 1 shows a first electronic device 41 such as a display 41 with a female Lightning connector 410. In this example, the first male connector 26 of the mini computer 1 is a male Lightning connector. The mini computer 1 is operatively connected to the first electronic device 41 with the first male connector 26 electrically connected to the female Lightning connector 410 of the first electronic device 41. After the mini computer 1 is successfully connected to the first electronic device 41, the multimedia data processed by the microprocessor 22 is output the first electronic device 41 for playback.

FIG. 5B is a schematic view showing the application of the second embodiment of the present invention. The example in FIG. 1 shows a second electronic device 42 such as a display 42 with a female HDMI connector 420. In this example, the first male connector 26 of the mini computer 1 is a male HDMI connector. The mini computer 1 is operatively connected to the second electronic device 42 with the first male connector 26 electrically connected to the female HDMI connector 420 of the second electronic device 42. After the mini computer 1 is successfully connected to the second electronic device 42, the multimedia data processed by the microprocessor 22 is output the second electronic device 42 for playback.

More particularly, by using the adapting stage 3, the mini computer 1 can use the third male connector 33 of the adapting stage 3 instead of the second male connector 27 for connecting to the second electronic device 42. In other word, the multimedia data is sent from the mini computer 1 to the second electronic device 42 through the second male connector 27, the second female connector 32, the conversion circuit 36, and the third male connector 33.

FIG. 5C is a schematic view showing the application of the third embodiment of the present invention. The example in FIG. 1 shows a third electronic device 43 such as a display 43 with a standard female USB 2.0, USB 3.0, USB 3.1 or USB 3.0 C-type connector 430. In this example, the first male connector 26 of the mini computer 1 is a male USB connector. The mini computer 1 is operatively connected to the third electronic device 43 with the first male connector 26 electrically connected to the female USB connector 430 of the third electronic device 43. After the mini computer 1 is successfully connected to the third electronic device 43, the multimedia data processed by the microprocessor 22 is output the third electronic device 43 for playback.

The main housing 2 of the mini computer 1 comprises at least two male connectors (namely the first male connector 26 and the second male connector 27) and the adapting stage 3 has at least one male connector (namely the third male connector 33). In other word, the mini computer 1 of the present invention can be connected to three different kinds of female connectors such as Lightning, HDMI, USB 2.0, USB 3.0, USB 3.1, USB 3.0 C-type connectors for the first male connector 26, the second male connector 27 and the third male connector 33. Therefore, the mini computer 1 of the present invention can support different kinds of electronic devices (for example, the display with different female connectors). The mini computer 1 of the present invention can play back multimedia data on those electronic devices.

Figure 7:
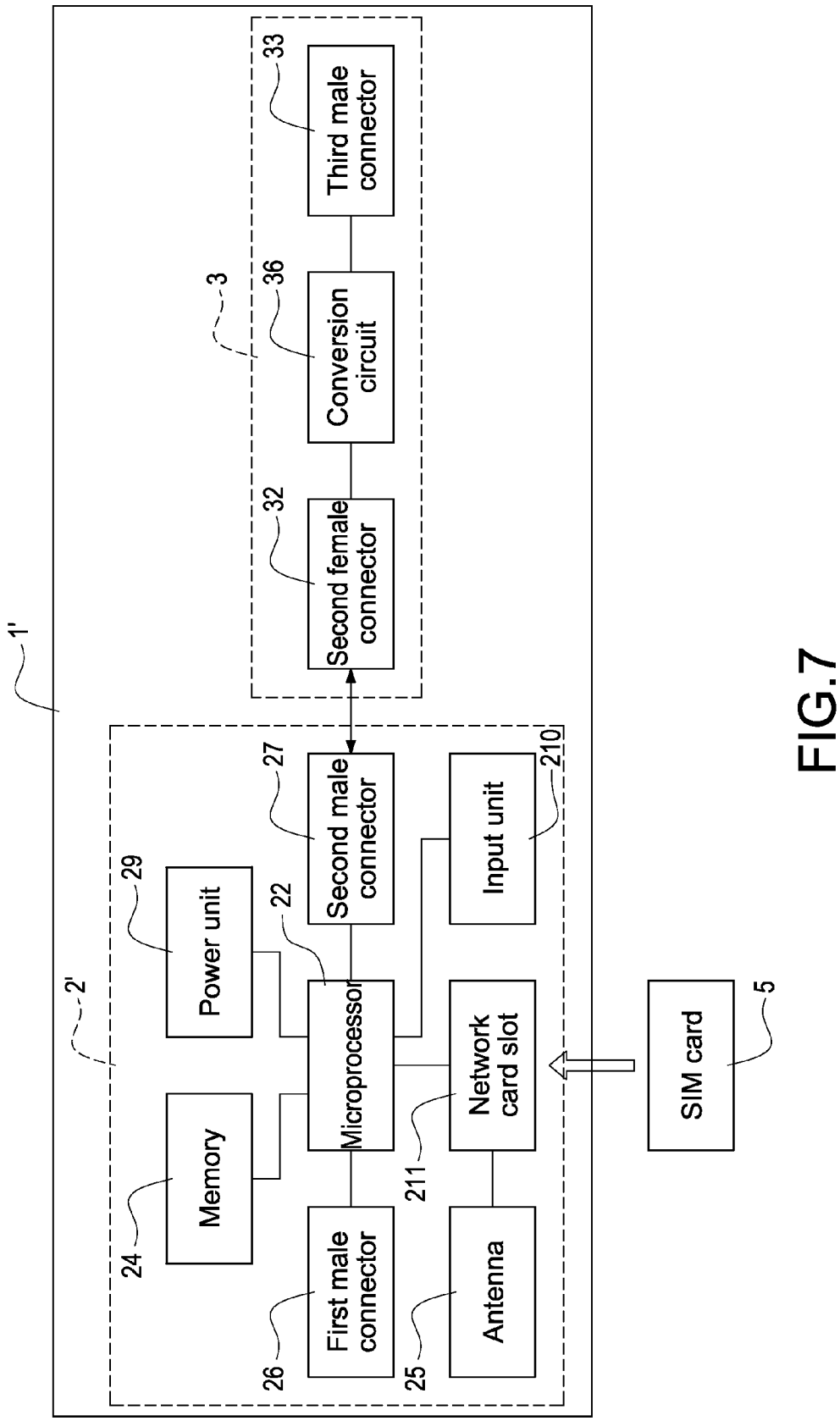
FIG. 7 is circuit block diagram of the second embodiment of the present invention.

FIG. 6 is the perspective view of the second embodiment of the present invention and FIG. 7 is circuit block diagram of the second embodiment of the present invention. The embodiment shown in FIGS. 6 and 7 disclose another mini computer 1' comprising another main housing 2' assembled with the above-mentioned adapting stage 3, in comparison with the above-mentioned mini computer 1.

As shown in FIGS. 6 and 7, the main housing 2' comprises the above-mentioned first circuit board 21, the microprocessor 22, the memory 24, the antenna 25, the first male connector 26, the second male connector 27, and the first casing 28 and optionally the power unit 29 and the input unit 210. In this embodiment, the wireless network unit 23 in the main housing 2 is replaced by a network card slot 211.

The network card slot 211 is electrically connected to the first circuit board 21 and further electrically connected to the microprocessor 22 through the first circuit board 21. The first casing 28 encloses the main housing 1 and exposes a part of the network card slot 211.

In the first embodiment, the mini computer 1 process network signal such as Wi-Fi signal through the built-in wireless network unit 23 and operatively connects to Internet. In this embodiment, an external wireless network card 5 can be plugged into the network card slot 211 of the mini computer 1'. The external wireless network card 5 is, for example but not limited to, 3 Generation (3G), 3.5G, Long Term Evolution (LTE), 5G SIM (Subscriber Identification Module) card, whereby the mini computer 1' can access Internet through the SIM card 5.

By the present invention, user can access three different kinds of interfaces for the mini computer 1, 1' and the multimedia data output by the mini computer 1, 1' can be conveniently played back. Moreover, user can select the mini computer 1 with built-in wireless network unit 23, or the mini computer 1' with network card slot 211 to access Internet according to his practical need and network environment.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multi-port mini computer comprising a main housing and an adapting stage,
    the main housing comprising a memory storing an operation system, a microprocessor electrically connected to the memory and executing the operation system after the mini computer is booted, a wireless network unit electrically connected to the microprocessor and receiving, sending and processing a wireless network signal, an antenna electrically connected to the wireless network unit, a first male connector electrically connected to the microprocessor and outputting a multimedia data processed by the microprocessor, a second male connector electrically connected to the microprocessor and outputting a multimedia data processed by the microprocessor; and a first casing enclosing the memory, the wireless network unit, the antenna, the first male connector and the second male connector, wherein a part of the first male connector exposes out of the first casing and a part of the second male connector exposes out of the first casing;
    the adapting stage connected to the main housing through a connection member and comprising: a conversion circuit, a second female connector electrically connected to the conversion circuit, a third male connector electrically connected to the conversion circuit and operatively connected to the second female connector through the conversion circuit, a second casing enclosing the second female connector, the third male connector and the conversion circuit, wherein a part of the second female connector exposes out of the second casing and a part of the second male connector exposes out of the second casing;
    wherein the first male connector, the second male connector and the third male connector are different kinds of male connectors, the second female connector is corresponding to the second male connector.

2. The multi-port mini computer in claim 1, wherein the main housing comprises a first circuit board, the microprocessor, the wireless network unit, the memory, the antenna, the first male connector and the second male connector are electrically connected to the first circuit board, the adapting stage comprises a second circuit board, and the second female connector, the third male connector and the conversion circuit are electrically connected to the second circuit board.

3. The multi-port mini computer in claim 2, wherein the first male connector extends from one end of the first circuit board, the second male connector, the second female connector and the third male connector are independently arranged connectors and respectively soldered to the first circuit board and the second circuit board.

4. The multi-port mini computer in claim 3, wherein the first male connector is male Lightning connector, the second male connector is male USB 2.0, USB 3.0, USB 3.1 or USB 3.0 C-type connector, the second female connector is female USB 2.0, USB 3.0, USB 3.1 or USB 3.0 C-type connector, the third male connector is male high definition multimedia interface (HDMI) connector.

5. The multi-port mini computer in claim 1, wherein the first casing has a sliding rail on at least one outer face thereof, the second casing is pivotally connected to the connection member on at least one outer face thereof, the connection member is of elongated shape and has a first pivot at one end thereof and a second pivot at another end thereof, the connection member is connected to the second casing through the first pivot and pivotally connected to the sliding rail of the first casing through the second pivot.

6. The multi-port mini computer in claim 5, wherein the main housing further comprises a power unit and an input unit respectively electrically connected to the microprocessor, the power unit provides electric power required by the mini computer and the input unit receives external operation command for the operation system.

7. A multi-port mini computer comprising a main housing and an adapting stage,
    the main housing comprising a memory storing an operation system, a microprocessor electrically connected to the memory and executing the operation system after the mini computer is booted, a wireless card slot electrically connected to the microprocessor and adapted to receive a wireless network card, an antenna electrically connected to the wireless network unit, a first male connector electrically connected to the microprocessor and outputting a multimedia data processed by the microprocessor, a second male connector electrically connected to the microprocessor and outputting a multimedia data processed by the microprocessor; and a first casing enclosing the memory, the wireless network unit, the antenna, the first male connector and the second male connector, wherein a part of the first male connector exposes out of the first casing, a part of the second male connector exposes out of the first casing and a part of the wireless card slot exposes out of the first casing; and
    the adapting stage connected to the main housing through a connection member and comprising:
    a conversion circuit, a second female connector electrically connected to the conversion circuit, a third male connector electrically connected to the conversion circuit and operatively connected to the second female connector through the conversion circuit, a second casing enclosing the second female connector, the third male connector and the conversion circuit, wherein a part of the second female connector exposes out of the second casing and the a part of the second male connector exposes out of the second casing;
    wherein the first male connector, the second male connector and the third male connector are different kinds of male connectors, the second female connector is corresponding to the second male connector.

8. The multi-port mini computer in claim 7, wherein the main housing comprises a first circuit board, the microprocessor, the wireless card slot, the memory, the antenna, the first male connector and the second male connector are electrically connected to the first circuit board, the adapting stage comprises a second circuit board, and the second female connector, the third male connector and the conversion circuit are electrically connected to the second circuit board.

9. The multi-port mini computer in claim 8, wherein the first male connector extends from one end of the first circuit board, the second male connector, the second female connector and the third male connector are independently arranged connectors and respectively soldered to the first circuit board and the second circuit board.

10. The multi-port mini computer in claim 9, wherein the first male connector is male Lightning connector, the second male connector is male USB 2.0, USB 3.0, USB 3.1 or USB 3.0 C-type connector, the second female connector is female USB 2.0, USB 3.0, USB 3.1 or USB 3.0 C-type connector, the third male connector is male high definition multimedia interface (HDMI) connector, the wireless card slot is adapted to receive a wireless network card supporting 3 generation (3G), 3.5G, long term evolution (LTE), or 5G subscriber identification module (SIM) communication protocol.

11. The multi-port mini computer in claim 7, wherein the first casing has a sliding rail on at least one outer face thereof, the second casing is pivotally connected to the connection member on at least one outer face thereof, the connection member is of elongated shape and has a first pivot at one end thereof and a second pivot at another end thereof, the connection member is connected to the second casing through the first pivot and pivotally connected to the sliding rail of the first casing through the second pivot.

12. The multi-port mini computer in claim 11, wherein the main housing further comprises a power unit and an input unit respectively electrically connected to the microprocessor, the power unit provides electric power required by the mini computer and the input unit receives external operation command for the operation system.

* * * * *